United States Patent
Sun et al.

(10) Patent No.: US 8,170,321 B2
(45) Date of Patent: May 1, 2012

(54) SYSTEM AND METHOD FOR CONTOUR TRACKING IN CARDIAC PHASE CONTRAST FLOW MR IMAGES

(75) Inventors: Ying Sun, Singapore (SG); Gareth Funka-Lea, Cranbury, NJ (US); Ravi Kumar, Bangalore (IN); Jens Gühring, Monmouth Junction, NJ (US)

(73) Assignee: Siemens Aktiengesellschaft, München (DE)

( * ) Notice: Subject to any disclaimer, the term of this patent is extended or adjusted under 35 U.S.C. 154(b) by 440 days.

(21) Appl. No.: 12/431,299

(22) Filed: Apr. 28, 2009

(65) Prior Publication Data

US 2009/0324012 A1 Dec. 31, 2009

Related U.S. Application Data

(60) Provisional application No. 61/055,508, filed on May 23, 2008.

(51) Int. Cl.
 *G06K 9/78* (2006.01)
(52) U.S. Cl. ............................................. 382/133
(58) Field of Classification Search ......... 382/128–133, 382/103, 111
See application file for complete search history.

(56) References Cited

U.S. PATENT DOCUMENTS

| | | | |
|---|---|---|---|
| 7,421,101 B2 * | 9/2008 | Georgescu et al. | 382/128 |
| 2005/0240099 A1 | 10/2005 | Sun et al. | |
| 2010/0027861 A1 * | 2/2010 | Shekhar et al. | 382/131 |
| 2010/0278405 A1 * | 11/2010 | Kakadiaris et al. | 382/131 |

OTHER PUBLICATIONS

C. Xu and J. L. Prince, "Snakes, Shapes and Gradient Vector Flow," IEEE Transaction on Image Processing, 7(3), pp. 359-369, Mar. 1998.

* cited by examiner

*Primary Examiner* — Nathan Ha
(74) *Attorney, Agent, or Firm* — Donald B. Paschburg; F. Chau & Associates, LLC

(57) ABSTRACT

A method for tracking a contour in cardiac phase contrast flow magnetic resonance (MR) images includes estimating a global translation of a contour in a reference image in a time sequence of cardiac phase contrast flow MR images to a contour in a current image in the time sequence of images by finding a 2-dimensional translation vector that maximizes a similarity function of the contour in the reference image and the current image calculated over a bounding rectangle containing the contour in the reference image, estimating an affine transformation of the contour in the reference image to the contour in the current image, and performing a constrained local deformation of the contour in the current image.

14 Claims, 5 Drawing Sheets

SYSTEM AND METHOD FOR CONTOUR TRACKING IN CARDIAC PHASE CONTRAST FLOW MR IMAGES

CROSS REFERENCE TO RELATED UNITED STATES APPLICATIONS

This application claims priority from "Contour Tracking in Cardiac Phase Contrast Flow MR Images", U.S. Provisional Application No. 61/055,508 of Sun, et al., filed May 22, 2008, the contents of which are herein incorporated by reference in their entirety.

TECHNICAL FIELD

This disclosure is directed to the propagation of vessel contours from a reference image to subsequent images for cardiac phase contrast flow MRI.

DISCUSSION OF THE RELATED ART

Quantifying blood flow is important in diagnosing a number of different heart conditions. Using MRI for this purpose has a number of advantages, as it is non-invasive and does not affect the flow that is being measured. Furthermore, with MRI it is possible to obtain flow measurements in any direction, and can simultaneously measure velocity of blood flow and lumen area, which aids in making accurate flow estimations.

The ability to measure flow with MRI was developed in the 1980's for in vivo use. There are two main groups of techniques for flow measurements with MRI: phase techniques, and time-of-flight (TOF) techniques. Imaging techniques that utilize phase changes are more widely used and include phase contrast (PC) imaging and the less frequently used Fourier velocity imaging.

The basis of magnetic resonance imaging is that when nuclei possessing a half-integer spin are placed inside a magnetic field, their magnetic moments will precess around the axis of the field. The frequency with which they will precess is called their resonance or Larmor frequency. Altering the intensity of the magnetic field will change the rate at which spins precess. The gradients used in MRI are fields with linearly varying intensity that are added to the main magnetic field. Applying a gradient to the field will thus alter the resonance frequency of spins. This means that since nuclei at different positions will experience different fields, they will also precess at different frequencies. The change in frequency will lead to an accumulation of phase, which is dependent on the frequency shift and the time it is applied. It is this phase shift that is utilized in phase contrast MRI to yield information about the motion of nuclei. Since the change in phase is directly dependent on the alteration in frequency, it is dependant on how far spins travel, which is an effect of their velocity.

Phase contrast images are usually obtained using a gradient echo sequence, which results in a sensitivity to dephasing due to inhomogeneity in the magnetic field, so-called T2*-dephasing. To reduce the effects of this dephasing, and other unwanted contributions to the phase, two separate images are acquired, and the phase contrast image is calculated as the difference in phase in these two images on a pixel-by-pixel basis. The two images are attained from two consecutive scans, using the same imaging parameters, but different gradient first moments. The change in the gradient first moment between the two scans, determines the amount of velocity encoding in the final image. The velocity encoding gradient can be applied to any one axis at a time to create an image sensitive to flow in that particular direction. Applying pulses on two or three axes simultaneously results in flow sensitivity in an oblique direction.

SUMMARY OF THE INVENTION

Exemplary embodiments of the invention as described herein generally include methods and systems for the propagation of vessel contours to subsequent images for a sequence of phase contrast flow magnetic resonance (MR) images, given the user-specified contour that delineates the boundaries of a vessel in one reference image. A propagation algorithm according to an embodiment has been tested on a sequence of images of the ascending and descending aorta and the aortic valve.

According to an aspect of the invention, there is provided a method for tracking a contour in cardiac phase contrast flow magnetic resonance (MR) images, including estimating a global translation of a contour in a reference image in a time sequence of cardiac phase contrast flow MR images to a contour in a current image in the time sequence of images by finding a 2-dimensional translation vector that maximizes a similarity function of the contour in the reference image and the current image calculated over a bounding rectangle containing the contour in the reference image, estimating an affine transformation of the contour in the reference image to the contour in the current image, and performing a constrained local deformation of the contour in the current image.

According to a further aspect of the invention, the contour represents a boundary of a vessel or a valve in a vessel, and tracking the boundary tracks motion of the boundary in the time sequence of images.

According to a further aspect of the invention, the 2-dimensional translation vector is determined by sampling all possible solutions over a search space defined by the bounding rectangle and the maximum possible displacements of the contour.

According to a further aspect of the invention, the method comprises finding a second 2-dimensional translation vector that maximizes a similarity function of the contour in the current image and a previous image calculated over a bounding rectangle containing the contour in the previous image, comparing with the 2-dimensional translation vector that maximizes a similarity function of the contour in the reference image and the current image, and selecting a 2-dimensional translation vector that generates a larger similarity measure.

According to a further aspect of the invention, when the cardiac phase contrast flow MR images are phase images, the similarity function is defined as $$S(\Delta x, \Delta y) = \sum_{(x,y)\in R} w(x, y; \Delta x, \Delta y)\cos(2\Delta\theta(x, y; \Delta x, \Delta y)),$$

where $(\Delta x, \Delta y)$ is a sample 2D translation vector, $(x,y)$ is a point in the reference image bounding rectangle, R represents the bounding rectangle, where $$w(x, y; \Delta x, \Delta y) = \frac{M_c(x + \Delta x, y + \Delta y)M_r(x, y)}{\sum_{(x,y)\in R} M_c(x + \Delta x, y + \Delta y)M_r(x, y)},$$

where $M_r(x,y)$ and $M_c(x,y)$ represent a magnitude of an image gradient at point (x,y) in the reference frame and the current frame, respectively, and $\Delta\theta(x,y;\Delta y,\Delta y)=\theta_c(x+\Delta x,y+\Delta y)-\theta_r(x,y)$, where $\theta_r(x,y)$ and $\theta_c(x,y)$ represent the edge orientation of the image gradient at point (x,y) in the reference frame and current frame, respectively.

According to a further aspect of the invention, when the cardiac phase contrast flow MR images are anatomy images, the similarity function is defined as $$S(\Delta x, \Delta y) = \sum_{(x,y) \in R} w(x, y; \Delta x, \Delta y) \cos(\Delta \theta(x, y; \Delta x, \Delta y)),$$

where $(\Delta x, \Delta y)$ is a sample 2D translation vector, $(x,y)$ is a point in the reference image bounding rectangle, R represents the bounding rectangle, $$w(x, y; \Delta x, \Delta y) = \frac{M_c(x + \Delta x, y + \Delta y) M_r(x, y)}{\sum_{(x,y) \in R} M_c(x + \Delta x, y + \Delta y) M_r(x, y)},$$

where $M_r(x,y)$ and $M_c(x,y)$ represent a magnitude of an image gradient at point $(x,y)$ in the reference frame and the current frame, respectively, and $\Delta\theta(x,y;\Delta x,\Delta y), \theta_c(x+\Delta,y+\Delta y) - \theta_r(x,y)$, where $\theta_r(x,y)$ and $\theta_c(x,y)$ represent the edge orientation of the image gradient at point $(x,y)$ in the reference frame and current frame, respectively.

According to a further aspect of the invention, the 2D translation vector is restricted to integer point shifts.

According to a further aspect of the invention, estimating an affine transformation comprises dividing the contour in the reference image into a plurality of overlapped local regions $R_k$ each having a center point $(x_k, y_k)$ representing its position, identifying, for each local region a corresponding position $(x'_k, y'_k)$ in the current image by searching for a region $R'_k$ that best matches $R_k$ according to a similarity function, where the search is confined within a small neighborhood centered at $(x_k+\Delta x_k, y_k+\Delta y_k)$, and estimating an affine transformation parameter vector a from $a=(X^T X)^{-1} X^T y$, where $y=[x'_1 \ y'_1 \ \ldots \ x'_K \ y'_K]^T$ denotes a collection of coordinates of the position points in the current image, and $$X = \begin{bmatrix} x_1 & y_1 & 1 & 0 & 0 & 0 \\ 0 & 0 & 0 & x_1 & y_1 & 1 \\ \vdots & \vdots & \vdots & \vdots & \vdots & \vdots \\ x_K & y_K & 1 & 0 & 0 & 0 \\ 0 & 0 & 0 & x_K & y_K & 1 \end{bmatrix}$$

is a matrix of coordinates of the position points in the reference image where each region corresponds to a row.

According to a further aspect of the invention, when the cardiac phase contrast flow MR images are phase images, the similarity function is defined as $$S(\Delta x, \Delta y) = \sum_{(x,y) \in R} w(x, y; \Delta x, \Delta y) \cos(2\Delta \theta(x, y; \Delta x, \Delta y)),$$

where $(\Delta x, \Delta y)$ is a sample 2D translation vector, $(x,y)$ is a contour position point in the reference image, R represents the small neighborhood about $(x,y)$, $$w(x, y; \Delta x, \Delta y) = \frac{M_c(x + \Delta x, y + \Delta y) M_r(x, y)}{\sum_{(x,y) \in R} M_c(x + \Delta x, y + \Delta y) M_r(x, y)},$$

where $M_r(x,y)$ and $M_c(x,y)$ represent a magnitude of an image gradient at point $(x,y)$ in the reference frame and the current frame, respectively, and $\Delta\theta(x,y;\Delta x,\Delta y)=\theta_c(x+\Delta x,y+\Delta y)-\theta_r(x,y)$, where $\theta_r(x,y)$ and $\theta_c(x,y)$ represent the edge orientation of the image gradient at point $(x,y)$ in the reference frame and current frame, respectively.

According to a further aspect of the invention, when the cardiac phase contrast flow MR images are anatomy images, the similarity function is defined as $$S(\Delta x, \Delta y) = \sum_{(x,y) \in R} w(x, y; \Delta x, \Delta y) \cos(\Delta \theta(x, y; \Delta x, \Delta y)),$$

where $(\Delta x, \Delta y)$ is a sample 2D translation vector, $(x,y)$ is a contour position point in the reference image, R represents the small neighborhood about $(x,y)$, $$w(x, y; \Delta x, \Delta y) = \frac{M_c(x + \Delta x, y + \Delta y) M_r(x, y)}{\sum_{(x,y) \in R} M_c(x + \Delta x, y + \Delta y) M_r(x, y)},$$

where $M_r(x,y)$ and $M_c(x,y)$ represent a magnitude of an image gradient at point $(x,y)$ in the reference frame and the current frame, respectively, and $\Delta\theta(x,y;\Delta x,\Delta y)=\theta_c(x+\Delta x,y+\Delta y)-\theta_r(x,y)$, where $\theta_r(x,y)$ and $\theta_c(x,y)$ represent the edge orientation of the image gradient at point $(x,y)$ in the reference frame and current frame, respectively.

According to a further aspect of the invention, performing a constrained local deformation of the contour comprises initializing a point $(x_k(s), y_k(s))$ on the contour in the current frame k corresponding to a point $(\tilde{x}(s), \tilde{y}(s))$ in the reference frame from $$\begin{bmatrix} x_k(s) \\ y_k(s) \end{bmatrix} = \begin{bmatrix} \tilde{x}(s) & \tilde{y}(s) & 1 & 0 & 0 & 0 \\ 0 & 0 & 0 & \tilde{x}(s) & \tilde{y}(s) & 1 \end{bmatrix} a_k$$

where $a_k$ is the estimated affine transformation for the $k^{th}$ frame, and deforming the contour using a gradient vector flow snake with high viscosity.

According to another aspect of the invention, there is provided a method for tracking a contour in cardiac phase contrast flow magnetic resonance (MR) images, including estimating a global translation of a contour in a reference image in a time sequence of cardiac phase contrast flow MR images to a contour in a current image in the time sequence of images, estimating an affine transformation of the contour in the reference image to the contour in the current image by dividing the contour in the reference image into a plurality of overlapped local regions $R_k$ each having a center point $(x_k, y_k)$ representing its position, for each local region, searching for a corresponding position $(x'_k, y'_k)$ in the current image in a region $R'_k$ that best matches $R_k$ according to a similarity function, where the search is confined within a small neighborhood centered at $(x_k+\Delta x_k, y_k+\Delta y_k)$, and estimating an affine transformation parameter vector a from the center point positions in the reference image and the current image, and performing a constrained local deformation of the contour in the current image.

According to a further aspect of the invention, estimating the global translation of the contour in the reference image comprises finding a 2-dimensional translation vector that maximizes a similarity function of the contour in the reference image and the current image calculated over a bounding rectangle containing the contour in the reference image.

According to a further aspect of the invention, estimating an affine transformation parameter vector a comprises calculating $a=(X^TX)^{-1}X^Ty$, where $y=[x'_1\,y'_1\ldots x'_K\,y'_K]^T$ denotes a collection of coordinates of the position points in the current image, and $$X = \begin{bmatrix} x_1 & y_1 & 1 & 0 & 0 & 0 \\ 0 & 0 & 0 & x_1 & y_1 & 1 \\ \vdots & \vdots & \vdots & \vdots & \vdots & \vdots \\ x_K & y_K & 1 & 0 & 0 & 0 \\ 0 & 0 & 0 & x_K & y_K & 1 \end{bmatrix}$$

is a matrix of coordinates of the position points in the reference image where each region corresponds to a row.

According to another aspect of the invention, there is provided a program storage device readable by a computer, tangibly embodying a program of instructions executable by the computer to perform the method steps for tracking a contour in cardiac phase contrast flow magnetic resonance (MR) images.

DETAILED DESCRIPTION OF EXEMPLARY EMBODIMENTS

Figure 1:
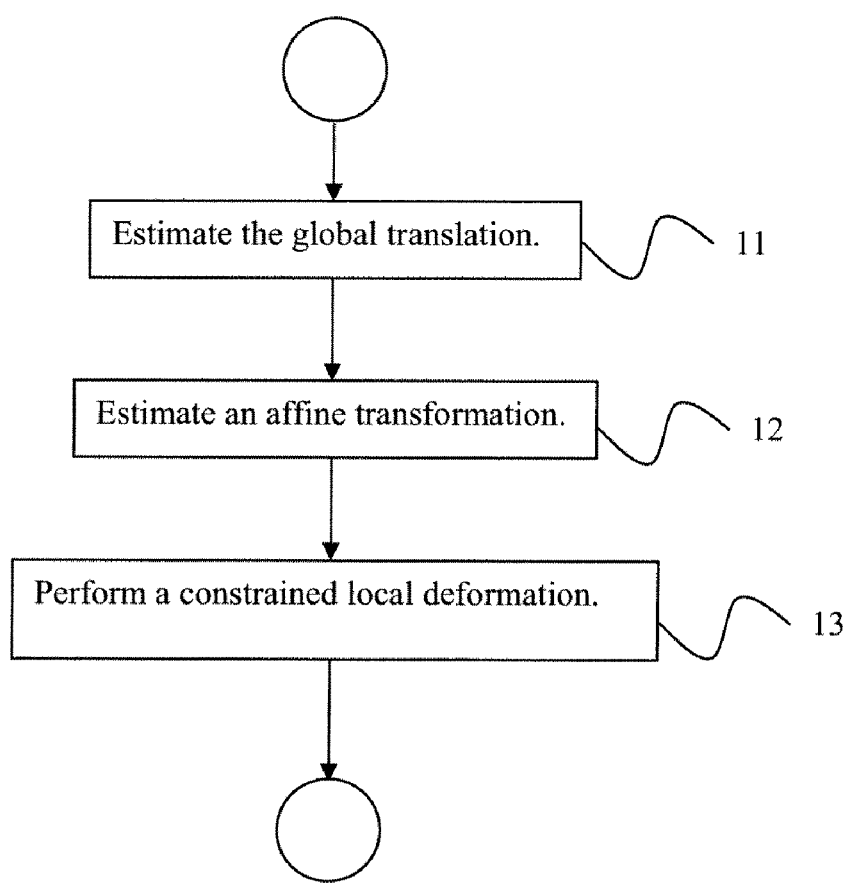
FIG. 1 is a flowchart of a method for propagating vessel contours in a sequence of cardiac phase contrast flow MR images, according to an embodiment of the invention.

Exemplary embodiments of the invention as described herein generally include systems and methods for propagating vessel contours in a sequence of cardiac phase contrast flow MR images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

FIG. 1 is a flowchart of a method for propagating vessel contours in a sequence of cardiac phase contrast flow MR images, according to an embodiment of the invention. As shown in the figure, given a contour and a time sequence of images, an algorithm according to an embodiment of the invention includes 3 steps: (1) estimating a global translation of a contour in a reference image to a contour in a current image, at step 11; (2) estimating the affine transformation of the contour in the reference image to the contour in the current image at step 12; and (3) performing a constrained local deformation of the contour in the current image at step 13. At the end of each step, a confidence check may be performed to determine whether to continue to the next step.

In cardiac phase contrast flow studies, there are three types of MR images:

(1) Phase image: phase reconstruction of the difference signal;

(2) Anatomy (rephased) image: magnitude reconstruction of the flow-compensated signal; and (3) Magnitude image: magnitude reconstruction of the difference signal.

Figure 2:
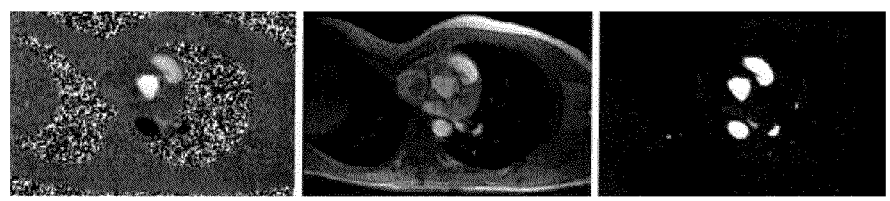
FIG. 2 illustrates three types of MR images acquired in a cardiac phase contrast flow study, according to an embodiment of the invention.

The quantitative measurement of flow velocity by MR imaging is based on acquiring two types of images: (1) a flow sensitized image, i.e. an image of which the contents are affected by the velocity of moving matter, typically flowing blood; and (2) an image whose contents are not affected by the motion, known as a flow compensated image. The image acquisition process is based on a particular sequence of magnetic gradient and RF pulses. The phase difference of these complex valued images is linearly related to the velocity. The linear scaling is a factor that may be set by a user, and is typically referred to as the VENC (Velocity ENCoding) factor. FIG. 2 illustrates three types of MR images that can be acquired in a cardiac phase contrast flow study, according to an embodiment of the invention. Referring know to the figure, from left to right, are the phase image, the anatomy (rephased) image, and the magnitude image. Among these images, the phase images are always available, while the anatomy images are sometimes available, and the magnitude images are generally not available. When only phase images are available, phase images can be used for contour tracking. When both anatomy and phase images are available, anatomy images can be used for contour tracking, as generally only a few phase images in an image sequence can provide reliable information about the contour.

For a step of identifying the global translation, an embodiment of the invention assumes that the motion of the valve/aorta is reduced to translational motion with integer pixel shifts. Given a hand-drawn contour in one image, a tracking algorithm according to an embodiment of the invention seeks to find the global translation of the contour in other images. This can be achieved by simple template matching.

In a formulation according to an embodiment of the invention, the image on which the contour is manually drawn is known as the reference frame. Let $\theta_r(x,y)$ and $M_r(x,y)$ represent respectively the direction and the magnitude of the image gradient at pixel (x,y) in the reference frame. One can obtain $\theta_r$ and $M_r$ using, for example, a Sobel edge detector. It should be noted that any edge detector can be used for this purpose. The set of pixels inside the smallest bounding rectangle of the given contour may be denoted as $R=\{(x,y)|x_a \leq x \leq x_b, y_a \leq y \leq y_b\}$, where $(x_a,y_a)$ and $(x_b,y_b)$ are the diagonal points that specify the bounding rectangle. A template may be represented by a set of four tuples $\{(x_r^l,y_r^l,\theta_r^l,M_r^l)|l \in R\}$. Let $\theta_c(x,y)$ denote the edge orientation and $M_c(x,y)$ the edge magnitude at pixel (x,y) in a current frame in a sequence of images. For each offset pair $(\Delta x, \Delta y)$, one can define an angle difference $\Delta\theta(x,y;\Delta x,\Delta y)$ and a weight function $w(x,y;\Delta x,\Delta y)$ as $$\Delta\theta(x, y; \Delta x, \Delta y) = \theta_c(x + \Delta x, y + \Delta y) - \theta_r(x, y), \quad (1)$$

$$w(x, y; \Delta x, \Delta y) = \frac{M_c(x, \Delta x, y + \Delta y)M_r(x, y)}{\sum_{(x,y) \in R} M_c(x + \Delta x, y + \Delta y)M_r(x, y)}. \quad (2)$$

When only phase images are available, a similarity measure according to an embodiment of the invention is as follows:

$$S(\Delta x, \Delta y) = \sum_{(x,y) \in R} w(x, y; \Delta x, \Delta y)\cos(2\Delta\theta(x, y; \Delta x, \Delta y)). \quad (3)$$

Here, the cosine of the double angle is used to handle contrast inversions that commonly occur in phase images. For example, the angle difference between an edge defined by a transition from dark to bright and by a transition from bright to dark is $\Delta\theta=\pi$, which results in $\cos(2\pi)=\cos(0)$. That is, it makes no distinction between two edges with exactly opposite directions.

In contrast to phase images, inversion of image contrast never happens in anatomy images. Therefore, for anatomy images, a similarity measure according to an embodiment of the invention is:

$$S(\Delta x, \Delta y) = \sum_{(x,y) \in R} w(x, y; \Delta x, \Delta y)\cos(\Delta\theta(x, y; \Delta x, \Delta y)). \quad (4)$$

Unlike the similarity measure of EQ. (3), the similarity measure of EQ. (4) makes a distinction between two edges with exactly opposite directions, i.e., $\cos \pi \neq \cos(0)$.

Let $(\Delta x_k, \Delta y_k)$ denote the global translation of the contour in the $k^{th}$ frame. The integer shifts that result in a maximum similarity measure are determined by exploring all possible solutions over a reasonable search space. The size of the search window can be determined by the size of the reference bounding rectangle and a maximum possible translational displacement of the vessel. Note that the value of the maximum similarity also plays a role as a confidence measure. To improve the robustness of the algorithm, one can use both the previous frame and the reference frame as templates. An algorithm according to an embodiment of the invention then chooses the match with a larger maximum similarity measure.

Figure 3:
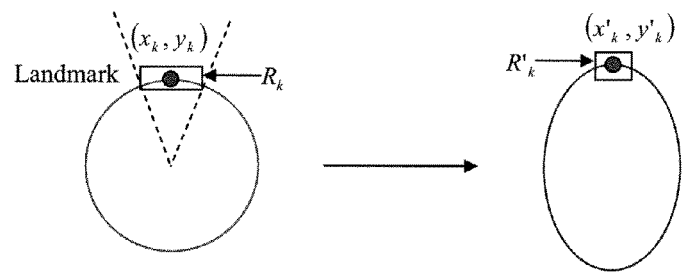
FIG. 3 depicts local region selection and tracking for estimating the affine transformation of a given contour, according to an embodiment of the invention.
Figure 4:
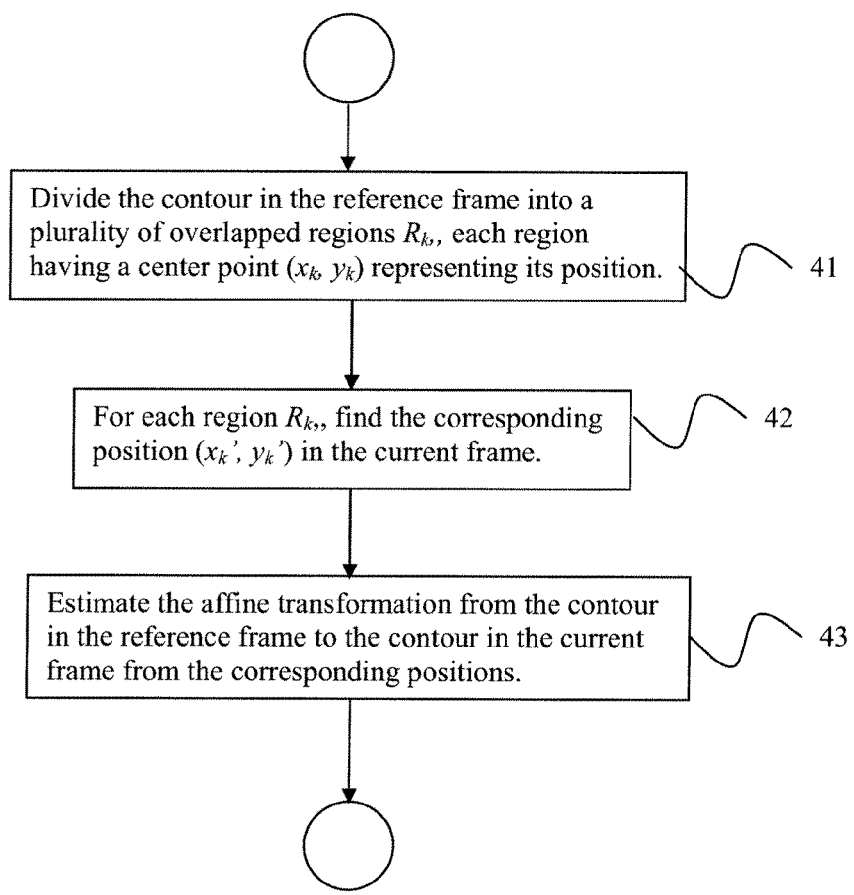
FIG. 4 is a flowchart of a method according to an embodiment of the invention for estimating the affine transformation.

A next step according to an embodiment of the invention is estimating the affine transformation. A flowchart of a method according to an embodiment of the invention for estimating the affine transformation is shown in FIG. 4. Referring now to the figure, as the shape of the contour is generally circular, the contour may be divided at step 41 into a plurality K of overlapped local regions $R_k$ with the center of each local region $(x_k, y_k)$ representing its position. For example, in an exemplary, non-limiting embodiment of the inventions, K=16 and each overlapped region spans 45 degrees. FIG. 3 depicts local region selection $R_k$ with center point $(x_k, y_k)$ on the left side and tracking for estimating the affine transformation of a given contour to the shape in a subsequent frame on the right side, according to an embodiment of the invention. At step 42, for each local region $R_k$, the corresponding position $(x'_k, y'_k)$ in a subsequent frame is identified by searching for region $R'_k$ that best matches $R_k$ according to the similarity measure given in EQS. (3) or (4). The search is confined within a small neighborhood centered at $(x_k + \Delta x_k, y_k + \Delta y_k)$ because: (1) large global translation $(\Delta x_k, \Delta y_k)$ has been compensated by dynamically adjusting the center of the search space to $(x_k + \Delta x_k, y_k + \Delta y_k)$; and (2) the shape of the contour does not change drastically between two consecutive frames.

Based on the correspondence of the region pairs represented by $(x_k, y_k)$ and $(x'_k, y'_k)$ one can estimate at step 43 an affine transformation for the given contour. The coordinates of the landmark points in the reference image can be collected in a matrix X as $$X = \begin{bmatrix} x_1 & y_1 & 1 & 0 & 0 & 0 \\ 0 & 0 & 0 & x_1 & y_1 & 1 \\ \vdots & \vdots & \vdots & \vdots & \vdots & \vdots \\ x_K & y_K & 1 & 0 & 0 & 0 \\ 0 & 0 & 0 & x_K & y_K & 1 \end{bmatrix}, \quad (5)$$

where each region corresponds to a row. Let y denote the collection of the coordinates of the landmark points in the current image:

$$y = [x'_1 \, y'_1 \ldots x'_K \, y'_K]^T. \quad (6)$$

Let a denote a 6×1 parameter vector that describes an affine transformation defined by y=Xa. Given X and y, an estimate of the affine transformation according to an embodiment of the invention is given by:

$$a = (X^T X)^{-1} X^T y. \quad (7)$$

Note that (1) unlike the integer shifts $(\Delta x_k, \Delta y_k)$ in the global translation step, the two translation parameters of the affine transformation are not necessarily integers, and (2) one may not be able to identify the corresponding region in the subsequent frame for every local region in the current frame. To ensure the robustness and reliability of an algorithm according to an embodiment of the invention, one may simply copy the coordinates of the position of a local region from the previous frame when the similarity measure or the average edge strength falls below a pre-defined threshold.

A third step of a contour tracking algorithm according to an embodiment of the invention is performing constrained local deformation. To obtain an accurate and smooth contour for the current image, according to an embodiment of the invention a constrained local deformation is performed. Let ($\tilde{x}(s)$, $\tilde{y}(s))$ denote a point on the given contour in the reference image. Let $a_k$ denote the estimated affine transformation for the $k^{th}$ frame. The initial position of the corresponding point of $(\tilde{x}(s), \tilde{y}(s))$ in frame k is given by:

$$\begin{bmatrix} x_k(s) \\ y_k(s) \end{bmatrix} = \begin{bmatrix} \tilde{x}(s) & \tilde{y}(s) & 1 & 0 & 0 & 0 \\ 0 & 0 & 0 & \tilde{x}(s) & \tilde{y}(s) & 1 \end{bmatrix} a_k \quad (8)$$

Because the affine transformation should have brought the contour to the vicinity of the actual boundary, the local deformation is strongly constrained to a local neighborhood. The deformation is achieved by deforming a gradient vector flow snake with high viscosity for a few iterations.

Gradient vector flow (GVF) is a class of external forces for active contours (snakes) that does not change with time or depend on the position of the snake itself. The underlying mathematical premise for this force comes from the Helmholtz theorem, which states that the most general static vector field can be decomposed into two components: an irrotational (curl-free) component and a solenoidal (divergence-free) component.

A traditional snake is a curve $x(s)=[x(s),y(s)]$, $s\in[0,1]$, that moves through the spatial domain of an image to minimize the energy functional $$E = \int \frac{1}{2}([\alpha|x'(s)|^2 + \beta|x''(s)|^2] + E_{ext}(x(s)))ds \quad (9)$$

where $\alpha$ and $\beta$ are weighting parameters that control the snake's tension and rigidity, respectively, and $x'(s)$ and $x''(s)$ denote the first and second derivatives of $x(s)$ with respect to s. The external energy function $E_{ext}$ is derived from the image so that it takes on its smaller values at the features of interest, such as boundaries. Given an image $I(x,y)$, viewed as a function of continuous position variables $(x,y)$, typical external energies designed to lead an active contour toward step edges are:

$$E_{ext}^{(1)}(x, y) = -|\nabla I(x, y)|^2, \quad (10)$$

$$E_{ext}^{(2)}(x, y) = -|\nabla[G_\sigma(x, y) * I(x, y)]|^2, \quad (11)$$

$$E_{ext}^{(3)}(x, y) = I(x, y), \quad (12)$$

$$E_{ext}^{(4)}(x, y) = G_\sigma(x, y) * I(x, y), \quad (13)$$

where $G_\sigma(x,y)$ is a two-dimensional Gaussian function with standard deviation $\sigma$ and $\nabla$ is the gradient operator. It may be seen from these definitions that larger $\sigma$'s will cause the boundaries to become blurry. Such large $\sigma$'s are often necessary, however, in order to increase the capture range of the active contour.

A snake that minimizes E satisfies the Euler equation $$\alpha x''(s) - \beta x''''(s) - \nabla E_{ext} = 0. \quad (14)$$

This can be viewed as a force balance equation $$F_{int} + F_{ext}^{(p)} = 0, \quad (15)$$

where $$F_{int} = \alpha x''(s) - \beta x''''(s) \text{ and } F_{ext}^{(p)} = -\nabla E_{ext}.$$

The internal force discourages stretching and bending while the external potential force pulls the snake toward the desired image edges.

To find a solution to EQ. (14), the snake is made dynamic by treating x as function of time t as well as s: $x(s,t)$. Then, the partial derivative of x with respect to t is set equal to the left hand side of EQ. (14) as follows:

$$x_t(s,t) = \alpha x''(s) - \beta x''''(s) - \nabla E_{ext}. \quad (16)$$

When the solution stabilizes, the term vanishes and one achieves a solution of EQ. (14). A numerical solution to EQ. (16) can be found by discretizing the equation and solving the discrete system iteratively.

The GVF approach is to use the force balance condition of EQ. (15) as a starting point for designing a snake. A new static external force field $F_{ext}^{(g)} = v(x,y)$ is defined below, referred to as the gradient vector flow (GVF) field. To obtain the corresponding dynamic snake equation, one replaces the potential force $-\nabla E_{ext}$ in EQ. (16) with $v(x,y)$, yielding $$x_t(s,t) = \alpha x''(s) - \beta x''''(s) + v. \quad (17)$$

This parametric curve solving the above dynamic equation is known as a GVF snake. It is solved numerically by discretization and iteration, in identical fashion to the traditional snake.

Although the final configuration of a GVF snake will satisfy the force-balance equation (15), this equation does not, in general, represent the Euler equations of the energy minimization problem in EQ. (9). This is because $v(x,y)$ will not, in general, be an irrotational field.

Defining a GVF field begins by defining an edge map $f(x,y)$ derived from the image $I(x,y)$ having the property that it is larger near the image edges. One can use any gray-level or binary edge map defined in the image processing literature such as $$f(x, y) = -E_{ext}^{(i)}(x, y), \quad (18)$$

where i=1, 2, 3, or 4, as in EQS. (10)-(13), above. Other more complicated noise removal techniques such as median filtering, morphological filtering, and anisotropic diffusion could also be used to improve the underlying edge map. The gradient vector flow field may be defined to be the vector field $v(x,y)=[u(x,y),(x,y)]$ that minimizes the energy functional $$E = \iint (\mu(u_x^2 + u_y^2 + v_x^2 + v_y^2) + |\nabla f|^2 |v - \nabla f|^2) dx dy. \quad (19)$$

This variational formulation follows a standard principle, that of making the result smooth when there is no data. In particular, when $|\nabla f|$ is small, the energy is dominated by sum of the squares of the partial derivatives of the vector field, yielding a slowly varying field. On the other hand, when $|\nabla f|$ is large, the second term dominates the integrand, and is minimized by setting $v=|\nabla f|\nabla$. This produces the effect of keeping v nearly equal to the gradient of the edge map when it is large, but forcing the field to be slowly-varying in homogeneous regions. The parameter $\mu$ is a regularization parameter that may be set according to the amount of noise present in the image (more noise, increase $\mu$).

Using the calculus of variations, the GVF field can be found by solving the following Euler equations $$\mu \nabla^2 u - (u - f_x)(f_x^2 + f_y^2) = 0, \quad (20a)$$

$$\mu \nabla^2 v - (v - f_x)(f_x^2 + f_y^2) = 0, \quad (20b)$$

where $\nabla^2$ is the Laplacian operator.

Equations (20a) and (20b) can be solved by treating u and v as functions of time and solving $$u_t(x,y,t) = \mu \nabla^2 u(x,y,t) - [u(x,y,t) - f_x(x,y)][f_x(x,y)^2 - f_y(x,y)^2] \quad (21a)$$

$$v_t(x,y,t) = \mu \nabla^2 v(x,y,t) - [v(x,y,t) - f_x(x,y)][f_x(x,y)^2 - f_y(x,y)^2] \quad (21b)$$

The steady-state solution of these linear parabolic equations is the desired solution of the Euler equations (20a) and (20b). Note that these equations are decoupled, and therefore can be solved as separate scalar partial differential equations in u and v.

Figure 5:
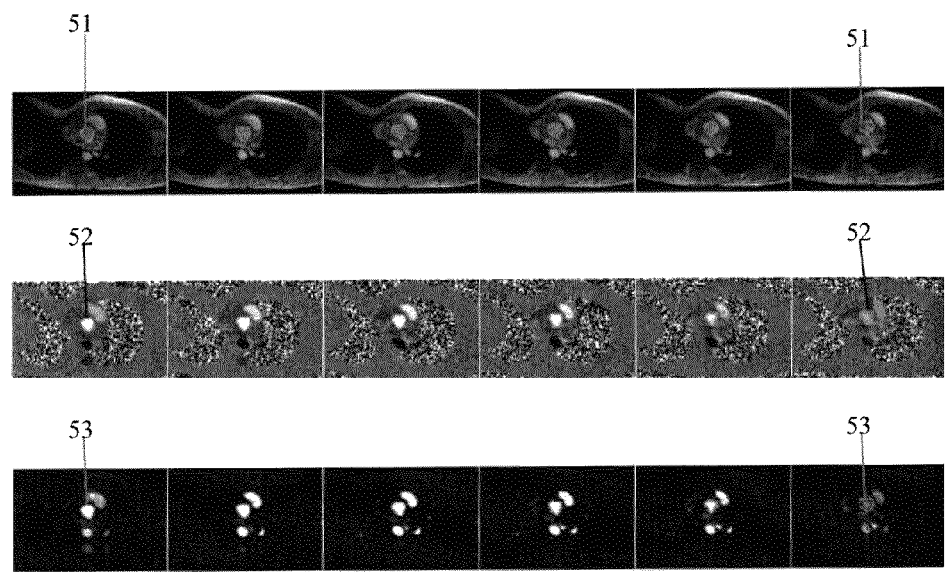
FIG. 5 depicts representative final contours obtained using a contour tracking algorithm for contour tracking in cardiac phase contrast flow MRI, according to an embodiment of the invention.

A final contour obtained by a contour tracking algorithm according to an embodiment of the invention is smooth, stays close to the affine transformation results, and can evolve to strong edges within a constrained local neighborhood. FIG. 5 depicts representative final contours obtained using a contour tracking algorithm for contour tracking in cardiac phase contrast flow MRI, according to an embodiment of the invention. Referring now to the figure, the top row depicts flow compensated images of the anatomy, the middle row depicts phase contrast images, where the phase value is proportional to the tissue velocity in areas where there is signal, but arbitrary in empty space, which produce a salt and pepper noise pattern, and the bottom row depicts angiographic contrast, which is bright for non-static tissue, and suppressed for static tissue and background. The angiographic contrast images typically show vessels. The images from left to right show different phases within the cardiac cycle, with time advancing from left to right. The contours 51, 52, 53 within each image row depict the same vascular structure over multiple time points. The shape and location of the contours are identical for the three matching images in one column, but are adjusted for contour shape changes between different time points. The avoid cluttering the figure, only contours in the leftmost and rightmost columns of each row are labeled.

It is to be understood that embodiments of the present invention can be implemented in various forms of hardware, software, firmware, special purpose processors, or a combination thereof. In one embodiment, the present invention can be implemented in software as an application program tangible embodied on a computer readable program storage device. The application program can be uploaded to, and executed by, a machine comprising any suitable architecture.

Figure 6:
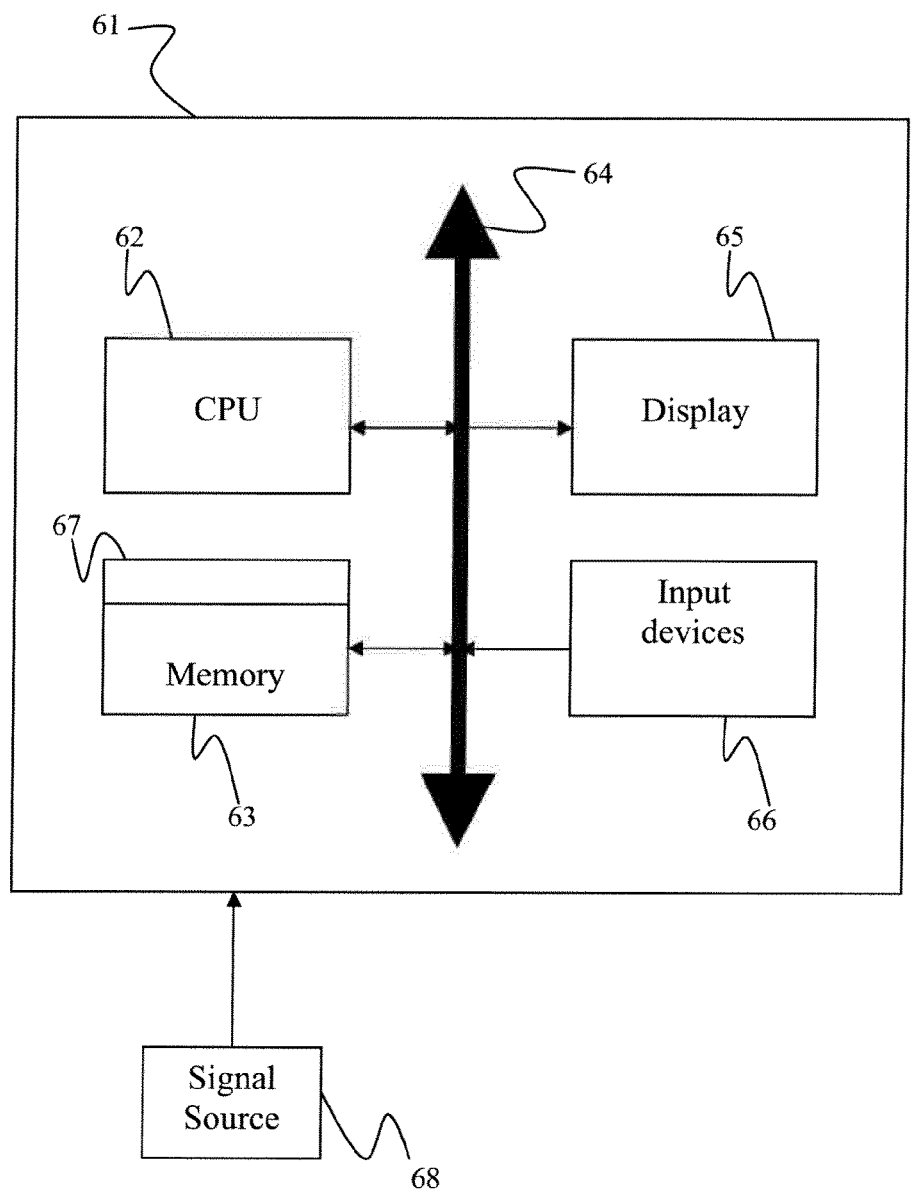
FIG. 6 is a block diagram of an exemplary computer system for implementing a method for propagating vessel contours in a sequence of cardiac phase contrast flow MR images, according to an embodiment of the invention.

FIG. 6 is a block diagram of an exemplary computer system for implementing a method for propagating vessel contours in a sequence of cardiac phase contrast flow MR images, according to an embodiment of the invention. Referring now to FIG. 6, a computer system 61 for implementing the present invention can comprise, inter alia, a central processing unit (CPU) 62, a memory 63 and an input/output (I/O) interface 64. The computer system 61 is generally coupled through the I/O interface 64 to a display 65 and various input devices 66 such as a mouse and a keyboard. The support circuits can include circuits such as cache, power supplies, clock circuits, and a communication bus. The memory 63 can include random access memory (RAM), read only memory (ROM), disk drive, tape drive, etc., or a combinations thereof. The present invention can be implemented as a routine 67 that is stored in memory 63 and executed by the CPU 62 to process the signal from the signal source 68. As such, the computer system 61 is a general purpose computer system that becomes a specific purpose computer system when executing the routine 67 of the present invention.

The computer system 61 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for tracking a contour in cardiac phase contrast flow magnetic resonance (MR) images, said method comprising the steps of:
    estimating a global translation of a contour in a reference image in a time sequence of cardiac phase contrast flow MR images to a contour in a current image in said time sequence of images by finding a 2-dimensional translation vector that maximizes a similarity function of the contour in the reference image and the current image calculated over a bounding rectangle containing the contour in the reference image;
    estimating an affine transformation of the contour in the reference image to the contour in the current image; and
    performing a constrained local deformation of the contour in the current image.

2. The method of claim 1, wherein said contour represents a boundary of a vessel or a valve in a vessel, and tracking said boundary tracks motion of said boundary in said time sequence of images.

3. The method of claim 1, wherein the 2-dimensional translation vector is determined by sampling all possible solutions over a search space defined by the bounding rectangle and the maximum possible displacements of the contour.

4. The method of claim 3, further comprising finding a second 2-dimensional translation vector that maximizes a similarity function of the contour in the current image and a previous image calculated over a bounding rectangle containing the contour in the previous image, comparing with the 2-dimensional translation vector that maximizes a similarity function of the contour in the reference image and the current image, and selecting a 2-dimensional translation vector that generates a larger similarity measure.

5. The method of claim 1, wherein when the cardiac phase contrast flow MR images are phase images, the similarity function is defined as $$S(\Delta x, \Delta y) = \sum_{(x,y) \in R} w(x, y; \Delta x, \Delta y) \cos(2\Delta\theta(x, y; \Delta x, \Delta y)),$$

wherein $(\Delta x, \Delta y)$ is a sample 2D translation vector, $(x,y)$ is a point in the reference image bounding rectangle, R represents the bounding rectangle, $$w(x, y; \Delta x, \Delta y) = \frac{M_c(x + \Delta x, y + \Delta y) M_r(x, y)}{\sum_{(x,y) \in R} M_c(x + \Delta x, y + \Delta y) M_r(x, y)},$$

wherein $M_r(x,y)$ and $M_c(x,y)$ represent a magnitude of an image gradient at point $(x,y)$ in the reference frame and the current frame, respectively, and $$\Delta\theta(x,y;\Delta x,\Delta y) = \theta_c(x+\Delta x, y+\Delta y) - \theta_r(x,y),$$

wherein $\theta_r(x,y)$ and $\theta_c(x,y)$ represent the edge orientation of the image gradient at point $(x,y)$ in the reference frame and current frame, respectively.

6. The method of claim 1, wherein when the cardiac phase contrast flow MR images are anatomy images, the similarity function is defined as $$S(\Delta x, \Delta y) = \sum_{(x,y) \in R} w(x, y; \Delta x, \Delta y) \cos(\Delta\theta(x, y; \Delta x, \Delta y)),$$

wherein $(\Delta x, \Delta y)$ is a sample 2D translation vector, $(x,y)$ is a point in the reference image bounding rectangle, R represents the bounding rectangle, $$w(x, y; \Delta x, \Delta y) = \frac{M_c(x + \Delta x, y + \Delta y) M_r(x, y)}{\sum_{(x,y) \in R} M_c(x + \Delta x, y + \Delta y) M_r(x, y)},$$

wherein $M_r(x,y)$ and $M_c(x,y)$ represent a magnitude of an image gradient at point $(x,y)$ in the reference frame and the current frame, respectively, and $$\Delta\theta(x,y;\Delta x,\Delta y) = \theta_c(x+\Delta x, y+\Delta y) - \theta_r(x,y),$$

wherein $\theta_r(x,y)$ and $\theta_c(x,y)$ represent the edge orientation of the image gradient at point $(x,y)$ in the reference frame and current frame, respectively.

7. The method of claim 1, wherein the 2D translation vector is restricted to integer point shifts.

8. The method of claim 1, wherein estimating an affine transformation comprises dividing the contour in the reference image into a plurality of overlapped local regions $R_k$ each having a center point $(x_k, y_k)$ representing its position, identifying, for each local region, a corresponding position $(x'_k, y'_k)$ in the current image by searching for a region $R'_k$ that best matches $R_k$ according to a similarity function, wherein the search is confined within a small neighborhood centered at $(x_k + \Delta x_k, y_k + \Delta y_k)$, and estimating an affine transformation parameter vector a from $a = (X^T X)^{-1} X^T y$, wherein $y = [x'_1\ y'_1\ \ldots\ x'_K\ y'_K]^T$ denotes a collection of coordinates of the position points in the current image, and $$X = \begin{bmatrix} x_1 & y_1 & 1 & 0 & 0 & 0 \\ 0 & 0 & 0 & x_1 & y_1 & 1 \\ \vdots & \vdots & \vdots & \vdots & \vdots & \vdots \\ x_K & y_K & 1 & 0 & 0 & 0 \\ 0 & 0 & 0 & x_K & y_K & 1 \end{bmatrix}$$

is a matrix of coordinates of the position points in the reference image wherein each region corresponds to a row.

9. The method of claim 8, wherein when the cardiac phase contrast flow MR images are phase images, the similarity function is defined as $$S(\Delta x, \Delta y) = \sum_{(x,y) \in R} w(x, y; \Delta x, \Delta y) \cos(2\Delta\theta(x, y; \Delta x, \Delta y)),$$

wherein $(\Delta x, \Delta y)$ is a sample 2D translation vector, $(x,y)$ is a contour position point in the reference image, R represents the small neighborhood about $(x,y)$, $$w(x, y; \Delta x, \Delta y) = \frac{M_c(x + \Delta x, y + \Delta y) M_r(x, y)}{\sum_{(x,y) \in R} M_c(x + \Delta x, y + \Delta y) M_r(x, y)},$$

wherein $M_r(x,y)$ and $M_c(x,y)$ represent a magnitude of an image gradient at point $(x,y)$ in the reference frame and the current frame, respectively, and $$\Delta\theta(x,y;\Delta x,\Delta y) = \theta_c(x+\Delta x, y+\Delta y) - \theta_r(x,y),$$

wherein $\theta_r(x,y)$ and $\theta_c(x,y)$ represent the edge orientation of the image gradient at point $(x,y)$ in the reference frame and current frame, respectively.

10. The method of claim 8, wherein when the cardiac phase contrast flow MR images are anatomy images, the similarity function is defined as $$S(\Delta x, \Delta y) = \sum_{(x,y) \in R} w(x, y; \Delta x, \Delta y) \cos(\Delta\theta(x, y; \Delta x, \Delta y)),$$

wherein $(\Delta x, \Delta y)$ is a sample 2D translation vector, $(x,y)$ is a contour position point in the reference image, R represents the small neighborhood about $(x,y)$, $$w(x, y; \Delta x, \Delta y) = \frac{M_c(x + \Delta x, y + \Delta y) M_r(x, y)}{\sum_{(x,y) \in R} M_c(x + \Delta x, y + \Delta y) M_r(x, y)},$$

wherein $M_r(x,y)$ and $M_c(x,y)$ represent a magnitude of an image gradient at point $(x,y)$ in the reference frame and the current frame, respectively, and $$\Delta\theta(x,y;\Delta x,\Delta y) = \theta_c(x+\Delta x, y+\Delta y) - \theta_r(x,y),$$

wherein $\theta_r(x,y)$ and $\theta_c(x,y)$ represent the edge orientation of the image gradient at point $(x,y)$ in the reference frame and current frame, respectively.

11. The method of claim 8, wherein performing a constrained local deformation of the contour comprises initializing a point $(x_k(s), y_k(s))$ on the contour in the current frame k corresponding to a point $(\tilde{x}(s), \tilde{y}(s))$ in the reference frame from $$\begin{bmatrix} x_k(s) \\ y_k(s) \end{bmatrix} = \begin{bmatrix} \tilde{x}(s) & \tilde{y}(s) & 1 & 0 & 0 & 0 \\ 0 & 0 & 0 & \tilde{x}(s) & \tilde{y}(s) & 1 \end{bmatrix} a_k$$

wherein $a_k$ is the estimated affine transformation for the $k^{th}$ frame, and deforming the contour using a gradient vector flow snake with high viscosity.

12. A method for tracking a contour in cardiac phase contrast flow magnetic resonance (MR) images, said method comprising the steps of:

estimating a global translation of a contour in a reference image in a time sequence of cardiac phase contrast flow MR images to a contour in a current image in said time sequence of images;

estimating an affine transformation of the contour in the reference image to the contour in the current image by dividing the contour in the reference image into a plurality of overlapped local regions $R_k$ each having a center point $(x_k, y_k)$ representing its position, for each local region, searching for a corresponding position $(x'_k, y'_k)$ in the current image in a region $R'_k$ that best matches $R_k$ according to a similarity function, wherein the search is confined within a small neighborhood centered at $(x_k + \Delta x_k, y_k + \Delta y_k)$, and estimating an affine transformation parameter vector a from the center point positions in the reference image and the current image; and performing a constrained local deformation of the contour in the current image.

13. The method of claim 12, wherein estimating the global translation of the contour in the reference image comprises finding a 2-dimensional translation vector that maximizes a similarity function of the contour in the reference image and the current image calculated over a bounding rectangle containing the contour in the reference image.

14. The method of claim 12, wherein estimating an affine transformation parameter vector a comprises calculating $a = (X^T X)^{-1} X^T y$, wherein $y = [x'_1 \ y'_1 \ \ldots \ x'_K \ y'_K]^T$ denotes a collection of coordinates of the position points in the current image, and $$X = \begin{bmatrix} x_1 & y_1 & 1 & 0 & 0 & 0 \\ 0 & 0 & 0 & x_1 & y_1 & 1 \\ \vdots & \vdots & \vdots & \vdots & \vdots & \vdots \\ x_K & y_K & 1 & 0 & 0 & 0 \\ 0 & 0 & 0 & x_K & y_K & 1 \end{bmatrix}$$

is a matrix of coordinates of the position points in the reference image wherein each region corresponds to a row.

\* \* \* \* \*